US011252934B1

(12) United States Patent
Cathey

(10) Patent No.: US 11,252,934 B1
(45) Date of Patent: Feb. 22, 2022

(54) COMPOSITIONS FOR USE IN ANIMAL HOUSING

(71) Applicant: Timothy D. Cathey, Lincolnton, NC (US)

(72) Inventor: Timothy D. Cathey, Lincolnton, NC (US)

(*) Notice: Subject to any disclaimer, the term of this patent is extended or adjusted under 35 U.S.C. 154(b) by 468 days.

(21) Appl. No.: 16/100,342

(22) Filed: Aug. 10, 2018

Related U.S. Application Data

(60) Provisional application No. 62/544,303, filed on Aug. 11, 2017.

(51) Int. Cl.
*A01K 1/00* (2006.01)
*A01K 1/015* (2006.01)
*A01N 59/14* (2006.01)
*A01N 27/00* (2006.01)
*A01N 59/20* (2006.01)
*A01N 37/36* (2006.01)

(52) U.S. Cl.
CPC .......... *A01K 1/0155* (2013.01); *A01K 1/0154* (2013.01); *A01N 27/00* (2013.01); *A01N 37/36* (2013.01); *A01N 59/14* (2013.01); *A01N 59/20* (2013.01)

(58) Field of Classification Search
CPC ........ A01N 27/00; A01N 27/36; A01N 59/14; A01N 59/20
USPC .................................................. 119/171–174
See application file for complete search history.

(56) References Cited

U.S. PATENT DOCUMENTS

| | | | |
|---|---|---|---|
| 3,059,615 A | 10/1962 | Kuceski et al. | |
| 4,193,986 A * | 3/1980 | Cox ...................... | A01N 65/00 119/654 |
| 4,369,199 A | 1/1983 | Katzen | |
| 5,016,568 A * | 5/1991 | Stanislowski ........ | A01K 1/0152 119/171 |
| 5,018,482 A * | 5/1991 | Stanislowski ........ | A01K 1/0155 119/173 |
| 5,135,743 A * | 8/1992 | Stanislowski ........ | A01K 1/0152 119/171 |
| 5,183,655 A * | 2/1993 | Stanislowski ........ | A01K 1/0152 119/171 |
| 5,189,987 A * | 3/1993 | Stanislowski ........ | A01K 1/0152 119/171 |
| 5,465,685 A * | 11/1995 | Dotolo ................. | A01K 13/003 119/651 |
| 5,945,333 A | 8/1999 | Rehberger | |
| 5,960,743 A | 10/1999 | Taylor | |
| 6,017,525 A | 1/2000 | Logan et al. | |
| 6,386,144 B1 | 5/2002 | Cathey | |
| 6,523,496 B1 | 2/2003 | Keithly et al. | |
| 6,708,647 B2 | 3/2004 | Keithly et al. | |
| 7,438,815 B1 | 10/2008 | Moore, Jr. | |
| 8,075,876 B2 | 12/2011 | Pavlicek et al. | |
| 2003/0116095 A1* | 6/2003 | Otsuji ................... | A01K 1/0107 119/165 |
| 2008/0041319 A1* | 2/2008 | Rasmussen .......... | A01K 13/001 119/603 |
| 2009/0038554 A1* | 2/2009 | Tsutsumi ............. | A01K 1/0154 119/166 |
| 2009/0044756 A1* | 2/2009 | Otsuji ................... | A01K 1/0107 119/169 |
| 2011/0243872 A1* | 10/2011 | Skrobanski .......... | A61K 8/8147 424/70.13 |
| 2012/0167836 A1* | 7/2012 | Morris .................. | A61L 9/01 119/860 |
| 2014/0338607 A1* | 11/2014 | Takagi ................. | A01K 1/0107 119/161 |
| 2014/0352630 A1* | 12/2014 | Messina ................ | A01N 49/00 119/712 |
| 2015/0289473 A1 | 10/2015 | Aylen et al. | |
| 2016/0116290 A1* | 4/2016 | Haverinen ............ | G01S 5/0263 701/525 |

OTHER PUBLICATIONS

Bjornsdottir K et al. Protective effects of organic acids on survival of *Escherichia coli* O157:H7 in acidic environments. Applied and Environmental Microbiology. Jan. 2006; 72(1): 660-664.

* cited by examiner

*Primary Examiner* — Richard T Price, Jr.
(74) *Attorney, Agent, or Firm* — Myers Bigel, P.A.

(57) ABSTRACT

Provided herein are compositions useful for improving conditions in animal housing. In some embodiments, the compositions may include, in combination: a) an organic acid; b) an organic terpene; and optionally, c) a strong mineral acid. In some embodiments, the composition has a pH of from 2 to 5, or from 2.5 to 4, or from 3 to 3.5. Also provided are processes for the control of ammonia and microbes in animal housing, which may include applying a composition as taught herein to at least a portion of the house, e.g., to the bedding of the house, whereby said applying steps result in the control of ammonia and/or microbes in the animal housing.

7 Claims, No Drawings

COMPOSITIONS FOR USE IN ANIMAL HOUSING

BACKGROUND

Providing optimal conditions for animal housing, such as poultry houses, leads to better health and performance of the animals. The overall condition of the animal housing can be affected by a number of factors, such as moisture, temperature, pH, ventilation, stocking density and frequency of cleanout of the litter. A number of approaches have been proposed over the years to address these factors and improve overall animal health and productivity.

U.S. Pat. No. 3,059,615 describes the use of phosphoric acid to acidify poultry litter for control of pathogenic bacteria.

U.S. Pat. No. 5,945,333 describes a biological treatment for poultry litter comprising a bacteriocin-producing bacteria, a protease-producing bacteria, and a starch fermenting bacteria.

U.S. Pat. No. 5,960,743 describes a clay-based litter acidified by sulfuric acid.

U.S. Pat. No. 6,017,525 describes addition of non-pathogenic bacteria to poultry litter.

U.S. Pat. No. 6,708,647 describes the use of byproduct or waste material from citrus juice extraction as a replacement for or supplement to traditional bedding materials.

U.S. Pat. No. 8,075,876 describes addition of a partially hydrated ferric sulfate composition to poultry litter to reduce ammonia emissions and reduce soluble phosphorus levels.

U.S. Patent Application Publication No. 2015/0289473 describes the use of citric acid and a clay-based particulate, organic material or diatomaceous earth for reducing ammonia levels in animal bedding.

Research has demonstrated the damaging effects of pathogenic microorganisms on poultry feed conversion and growth. The greater the concentration of pathogens in the house, the greater the decrease in feed conversion and decrease in body weight gain. Unfortunately, the environment of poultry houses typically deteriorates over time with multiple flock cycles, resulting in an even greater build-up of pathogenic microorganisms and higher losses for the growers.

Existing bedding treatments are expensive and do not provide a long-lasting effect. New and improved methods and compositions for use in animal housing such as poultry houses remains a significant need.

SUMMARY

Provided herein according to some embodiments is an aqueous composition comprising, in combination: a) an organic acid (e.g., citric acid, lactic acid, or a combination thereof); b) an organic terpene (e.g., a citrus terpene such as D-Limonene extract, a triterpene such as azadirachtin found in neem oil); and optionally, c) a strong mineral acid (e.g., sulfuric acid, hydrochloric acid, or a mixture thereof), wherein said composition has a pH of from 2 to 5, or from 2.5 to 4, or from 3 to 3.5.

In some embodiments, the organic acid is provided in said composition at a concentration of from 2 to 30% by weight of said composition; the organic terpene is provided in said composition at a concentration of from 0.05 to 6% by weight of said composition; and/or the mineral acid, when present, is provided in said composition at a concentration of from 5 to 15% by weight of said composition.

In some embodiments, the organic acid comprises from 1 to 15% citric acid by weight of said composition, and from 0.5 to 10% lactic acid by weight of said composition.

In some embodiments, the composition further comprises a fungicide or coccidiostat (e.g., copper sulfate, e.g., in a concentration of from 0.1 to 20% by weight of said composition).

In some embodiments, the composition further comprises boric acid (e.g., in a concentration of from 1 to 15% by weight of said composition).

In some embodiments, the composition further comprises ozone.

In some embodiments, the composition further comprises gypsum (and optionally wherein said composition does not comprise sulfuric acid).

Also provided is an animal bedding comprising a composition as taught herein. In some embodiments, the animal bedding comprises rice hulls, soft wood sawdust/shavings, or a combination thereof. In some embodiments, the animal bedding comprises gypsum (e.g., powdered gypsum) (and optionally wherein said composition does not comprise sulfuric acid).

Further provided is a process for the control of ammonia and/or microbes in animal housing, comprising: optionally, applying a floor conditioner composition as taught herein to the floor of the animal housing, optionally, applying a wash down composition as taught herein to the structure/equipment of the housing, and applying a bedding treatment composition as taught herein to the bedding of the house, whereby said applying steps result in the control of ammonia and/or microbes in the animal housing.

In some embodiments, the step of applying the bedding to the floor of the animal housing is performed before the step of applying the bedding treatment composition to the bedding. In some embodiments, the step of applying the bedding to the floor of the animal housing is performed after the step of applying the bedding treatment composition to the bedding.

In some embodiments, the process comprises the step of applying a floor conditioning composition, and said floor conditioning composition comprises sulfuric acid.

In some embodiments, the process further comprises applying elemental sulfur to the floor of the animal housing.

In some embodiments, the process comprises applying gypsum to the floor of the animal housing.

In some embodiments, the floor of the animal housing is covered by a physical barrier.

In some embodiments, the animals are avian animals such as chickens, turkeys or ducks.

DETAILED DESCRIPTION

The present disclosure provides compositions comprising certain combinations of active ingredients, said compositions providing enhanced control of pathogens and/or ammonia while significantly improving overall animal health and/or productivity.

Provided herein in some embodiments is a composition (e.g., an aqueous composition) comprising, consisting of or consisting essentially of one or more of, in any combination or subcombination: an organic acid (e.g., citric acid, lactic acid, or a combination thereof); an organic terpene (e.g., a citrus terpene such as D-Limonene extract, a triterpene such as azadirachtin found in neem oil); a strong acid (e.g., sulfuric acid, hydrochloric acid, or a combination thereof); a fungicide (e.g., copper sulfate); a coccidiostat; boric acid; and ozone.

An organic acid as taught herein is an organic compound that is an acid, such as a carboxylic acid (i.e., an organic compound having a carboxyl group). Examples include, but are not limited to, citric acid (2-hydroxypropane-1,2,3-tricarboxylic acid), lactic acid (e.g., 2-hydroxypropanoic acid), malic acid (2-hydroxybutanedioic acid), caproic acid (hexanoic acid), carbonic acid, etc.

A strong mineral acid as taught herein is an inorganic acid with an acid dissociation constant ($K_a$) of less than about −1 or −2, such as, e.g., sulfuric acid, hydrochloric acid, and nitric acid. In some embodiments, cost may be reduced and/or effectiveness enhanced by blending mineral acids (hydrochloric acid and sulfuric acid) for pH reduction.

Organic terpenes are volatile unsaturated hydrocarbons naturally found in the essential oils of plants, such as conifers, citrus trees, and herbs. These terpenes may be provided, e.g., in the form of the essential oil, or in a more purified form. Examples of terpenes that may be used in the compositions as taught herein include, but are not limited to, citrus terpenes, neem oil terpenes, nutmeg oil terpenes, oregano oil terpenes, cannabus terpenes, etc. For example, limonene is a cyclic terpene found in citrus fruit such as lemons and oranges. Limonene may be D-limonene, L-limonene, or a mixture thereof. As another example, azadirachtin is a triterpene found in neem oil.

Fungicides as used herein include, but are not limited to, copper-containing compounds such as copper sulfate, natural fungicides such as tea tree oil, etc.

Coccidiostats are antiprotozoal agents and include, but are not limited to, ampolium, arprinocid, artemether, clazuril, clopidol, decoquinate, dislazuril, dinitolmide, ethopabate, halofuginone, lasalocid, monensin, narasin, nicarbazin, oryzalin, ponazuril, robenidine, roxarsone, salinomycin, spiramycin, sulfadiazine, toltrazuril, triazuril, etc. In some embodiments, the coccidiostat is a copper-containing compound, such as copper sulfate.

Ozone is trioxygen, or $O_3$, and is a powerful oxidant. It can be dissolved in water for cleaning or sanitation purposes.

Generally, compositions as taught herein have an acidic pH. In some embodiments, the composition has a pH of from 2.5 to 4. In some embodiments, the composition has a pH of from 3 to 3.5. In some embodiments, the composition has a pH of 3.2. In some embodiments, the pH is from 2 to 5. In some embodiments, the pH is from 3 to 5 or from 4 to 5. In some embodiments, the pH is from 4 to 6, or 4 to 6.4.

The pH kill zone for acids alone is pH of about 3.7, and this is sufficient to stop growth of most organisms. When the pH reaches 6.4, the litter organisms consume the nitrogen and typically grow uncontrolled up to 8.4 pH, at which point most organisms stop growth.

In some embodiments, the composition comprises both a mineral acid (or combination of mineral acids) and an organic acid (or combination of organic acids). Literature research supports that the presence of some organic acids and mineral acids together may have a higher kill rate of microbes than reduced pH alone. See Bjornsdottir et al., Applied and Environmental Microbiology, January 2006, pp. 660-664.

In some embodiments, acidic water (e.g., reverse osmosis water) is used in forming the composition.

In some embodiments, the composition may be provided as a concentrate, for dilution and application to a structure where animals are housed, such as the animal bedding, floor (e.g., dirt floor upon which animal bedding is placed) or housing frame structure (e.g., walls and/or ceiling). In some embodiments, a concentrate, or "syrup," may have additional ingredients added before use.

Animal bedding as used herein may be any animal bedding known for use in agricultural or other animal housing. Examples include, but are not limited to, straw, wood shavings such as pine shavings or cedar shavings, saw dust, sand, peanut hulls, rice hulls, shredded sugar cane, gypsum, combinations thereof, etc. In some embodiments, the animal bedding comprises rice hulls. In some embodiments, the animal bedding comprises gypsum. In some embodiments, the animal bedding comprises waste paper pulp. In some embodiments the animal bedding comprises cotton waste products. In some embodiments, the animal bedding comprises citrus waste products. See, e.g., U.S. Pat. No. 6,386,144 to Timothy D. Cathey; U.S. Pat. No. 6,708,647 to James H. Keithly et al.

In some embodiments, after use, animal bedding treated with the compositions taught herein may optionally be further processed and/or be used for fertilizer or ruminant feed. See, e.g., U.S. Pat. No. 6,386,144 to Timothy D. Cathey.

In some embodiments, compositions as taught herein when applied to animal bedding can maintain an acidic pH (i.e., pH less than 7.0) in an occupied animal house for at least 5, 7, 10, 14, 18, or 21 days. In some embodiments, compositions as taught herein when applied to animal bedding can maintain an acidic pH for at least 1, 2, 3, 4, 5, 6 or 7 weeks. In some embodiments, compositions as taught herein when applied to animal bedding can maintain an acidic pH for at least 8, 10, 12, 15, 20, or 22 weeks or more.

Compositions as taught herein may be formulated particularly for specific areas of the animal housing and/or particular stages of the animal life cycle. For instance, in poultry farming, a composition may be formulated particularly for one or more of: house/equipment washdown, floor conditioning, bedding treatment for brood house, bedding treatment for grow out house, treatment for used (dirty) litter, etc.

In some embodiments, the floor conditioning composition may include a strong corrosive sulfuric acid solution to reduce soil pH, reduce pathogens, along with organic acids, coccidiostat, terpenes and hydrochloric acid. Without wishing to be bound by theory, the sulfur ions may reduce pH without bacterial action and/or react with the clay soils by biological action (with bacteria) over time. The H+ ions of the acids reduces pH immediately to a shallow depth. Elemental sulfur application may also be used to accelerate the clay soil pH reduction by biological action. The sulfuric acid may also break down the polysaccharide cover of bacteria to expose the cell wall for degradation and death. Ozone may be added in some embodiments as an inexpensive quick-kill agent. Also, it may break down the protein shell of viruses and spores. The sulfuric acid may increase the solubility of ozone in water.

The floor conditioning composition may be applied multiple times, with each subsequent application reducing soil pH further. In some embodiments, the application(s) may be carried out by flood application (gravity feed flooding reduces aerosols compared to pressure spraying for safety and reduced corrosion to the house structure).

In some embodiments, the floor conditioning composition may include a strong caustic base solution to reduce pathogens. Exemplary base solutions include, but should not be limited to, caustic soda solutions comprising sodium hydroxide, potassium hydroxide, or a combination thereof. In some embodiments, the concentration of the caustic soda solution is about 0.5% to about 10% by weight (or about 1%, 2%, 3%, 4%, 5%, 6%, 7%, 8%, 9%, or 10% by weight). In some embodiments, such a floor conditioning composition is used to sterilize paved and/or concrete and/or asphalt and/or soil floors.

In some embodiments, the bedding treatment composition may be a less corrosive composition than the floor conditioning composition, with relatively higher amounts of organic acids and terpenes and very little, if any, sulfuric acid (and no sulfuric acid if gypsum is included in the composition). Application to fresh bedding (e.g., by flood application) reduces pathogens and the pH of the bedding. In combination with pH, the organic acids increase the kill ratio. Again, ozone may also be added as an inexpensive, short-acting kill agent, if desired.

In some embodiments, the wash down composition may be a very low corrosive composition that is suitable for spray application to the ceiling and walls of the house and/or equipment, whereas a more corrosive solution may damage the structure and/or equipment. The composition may include mineral acid (HCl), organic acid, boric acid and/or coccidiostat to sanitize the remaining interior of the house or housing.

For a poultry grow-out house, in some embodiments, the house receives the floor conditioner in addition to the bedding treatment for the first flock. In some embodiments, the litter may be reused for subsequent flocks because the mineral acid (HCl) is in sufficient quantity for longevity of the pH reduction of the dirty litter. Additional powder gypsum application over the bedding may also help with pH buffering.

In some embodiments, a used litter treatment composition is applied to used bedding/litter to aid in ammonia control, particularly old litter from previously-treated bedding as taught herein.

In some embodiments, compositions may include one or more of, in any combination or subcombination, citric acid, lactic acid, terpenes, sulfuric acid, boric acid, copper sulfate, hydrochloric acid as an aqueous solution (i.e., in water). Ingredients may be provided as aqueous solutions for mixture into a final composition as taught herein. For example: citric acid as a 50% solution, lactic acid as an 88% solution, terpenes as a 97, 98 or 99% solution, sulfuric acid as a 93, 95, 97 or 98% solution, boric acid as a 16% solution, copper sulfate as a 15% solution, and/or hydrochloric acid as a 32% solution. Of course, alternative solutions may be used, and the volume added to the final composition adjusted as appropriate.

In some embodiments, compositions may include magnesium sulfate.

For example, in some embodiments the composition for wash down comprises as provided in Table 1:

TABLE 1

| Wash Down Ingredient | Weight % of Composition |
| --- | --- |
| citric acid | 5-10% (e.g., 6.3%) |
| lactic acid | 0.5-5% (e.g., 2.1%) |
| terpenes (e.g., D-limonene) | 0.1-6% (e.g., 0.7%) |
| $H_2SO_4$ | — |
| boric acid | 2-10% (e.g., 5.2%) |
| $CuSO_4$ | 0.1-4% (e.g., 0.9%) |
| HCl | — |
| $H_2O$ | to balance (i.e., to attain 100%, e.g., 84.8%) |
| total | 100% |

An example application rate of the above Wash Down composition is 4, 6, 8 or 10 gallons/1000 square feet.

In some embodiments, the wash down composition further includes ozone at 0.1 ppm to 2.0 ppm (e.g., about 0.5 ppm).

For example, in some embodiments the composition for floor conditioning comprises as provided in Table 2:

TABLE 2

| Floor Conditioning Ingredient | Weight % of Composition |
| --- | --- |
| citric acid | 2-10% (e.g., 3.5%) |
| lactic acid | 0.1-5% (e.g., 1.1%) |
| terpenes (e.g., D-limonene) | 0.05-6% (e.g., 0.2%) |
| $H_2SO_4$ | 5-15% (e.g., 7%) |
| boric acid | 1-8% (e.g., 2.4%) |
| $CuSO_4$ | 0.1-2% (e.g., 0.5%) |
| HCl | — |
| $H_2O$ | to balance (e.g., 85.3%) |
| total | 100% |

An example application rate of the floor conditioning composition is about 5, 10, 20, 25 or 30 gallons/1000 square feet.

For example, in some embodiments the composition for bedding treatment for a brood house comprises as provided in Table 3:

TABLE 3

| Brood Bedding Treatment Ingredient | Weight % of Composition |
| --- | --- |
| citric acid | 5-25% (e.g., 11.6%) |
| lactic acid | 1-10% (e.g., 3.8%) |
| terpenes (e.g., D-limonene) | 0.1-8% (e.g., 0.6%) |
| $H_2SO_4$ | — |
| boric acid | 3-15% (e.g., 6.3%) |
| $CuSO_4$ | 10-35% (e.g., 15.8%) |
| HCl | 2-20% (e.g., 8.3%) |
| $H_2O$ | to balance (e.g., 53.6%) |
| total | 100% |

An example application rate of the brood bedding treatment composition is about 150, 200, 250, 300, or 350 gallons per 17.3 tons of bedding. In some embodiments, the application rate and/or composition is adjusted so that the levels of boric acid do not exceed 2 pounds per acre.

For example, in some embodiments the composition for bedding treatment for a grow out house comprises (though in some embodiments, the sulfuric acid is omitted) as provided in Table 4:

TABLE 4

| Grow Out House Bedding Treatment Ingredient | Weight % of Composition |
| --- | --- |
| citric acid | 5-30% (e.g., 13.7%) |
| lactic acid | 2-15% (e.g., 4.5%) |
| terpenes (e.g., D-limonene) | 0.1-8% (e.g., 0.7%) |
| $H_2SO_4$ | — |
| boric acid | 3-20% (e.g., 7.4%) |

TABLE 4-continued

| Grow Out House Bedding Treatment Ingredient | Weight % of Composition |
|---|---|
| CuSO$_4$ | 0.1-5% (e.g., 0.7%) |
| HCl | 5-25% (e.g., 9.8%) |
| H$_2$O | to balance (e.g., 63.2%) |
| total | 100% |

An example application rate of the grow out house bedding treatment composition is about 150, 200, 250, 300, or 350 gallons per 17.3 tons of bedding. In some embodiments, the application rate and/or composition is adjusted so that the levels of boric acid do not exceed 2 pounds per acre.

For example, in some embodiments the composition for used litter treatment comprises as provided in Table 5:

TABLE 5

| Used Litter Treatment Ingredient | Weight % of Composition |
|---|---|
| citric acid | 10-40% (e.g., 13.2%) |
| lactic acid | 2-15% (e.g., 4.3%) |
| terpenes (e.g., D-limonene) | 0.1-8% (e.g., 0.5%) |
| H$_2$SO$_4$ | 1-16% (e.g., 8%) |
| boric acid | 1-10% (e.g., 5.7%) |
| CuSO$_4$ | 0.1-5% (e.g., 0.6%) |
| HCl | 3-25% (e.g., 7.4%) |
| H$_2$O | to balance (e.g., 60.3%) |
| total | 100% |

An example application rate of the used litter treatment composition is about 15, 20, 25, 30, or 35 gallons/1000 square feet for a second flock.

In some embodiments, the compositions may be provided as concentrated solutions that may be diluted with water just before use.

The present invention is further described in the following non-limiting examples.

EXAMPLES

Example 1: aGroPure Bedding Treatment

Initial Formulation comprising citric acid, lactic, terpenes, and copper sulfate, as shown in Table 6.1, was applied to an "A" House with two flocks of dirty rice hull litter. Rate of application was based at a per square foot rate. Goal was to adjust the litter pH down to 4.7 to 4.2.

TABLE 6.1

| | | | | Initial Formulation (Syrup) | | |
|---|---|---|---|---|---|---|
| Additive Stock Solutions | | | % of | | Order | |
| Ingredient | Concentration % | Lb/g | Total mix | Gallons (g) | of addition | Pounds (Lb) |
| Citric Acid | 50.0 | 10.4 | 77.2 | 193 | 1 | 2007.2 |
| Lactic Acid | 88.0 | 10.08 | 20.8 | 52 | 2 | 524.2 |
| D-Limonene* | 97.0 | 7 | 1.2 | 3 | 3 | 21.0 |
| Copper sulfate | 15.2 | 11.34 | 0.8 | 2 | 4 | 22.7 |

*Terpene

Results: The ammonia began being noticed at 4 weeks after application to the two flock old dirty grow-out litter, meaning the pH was over 6.5. Therefore, the pH did not stay acidic past 4 weeks.

Example 2: Testing of New Formulation on Rice Hulls Bedding

House "B" 18,500 Sq. Ft. received NEW formulation (01) Rice Hulls spray, and rice hulls were tilled to intermix treatment. The NEW formulation (01) Rice Hulls spray included 80 gallons of the Initial Formulation from Example 1 above, mixed with 121 gallons of water, 2 gallons of 15% copper sulfate, 33 gallons of 16% boric acid, 3 gallons of 97% D-limonene, and 11 gallons of hydrochloric acid, as indicated in Table 6.2

TABLE 6.2

| (01) New Rice Hull Formulation | | | | | | |
|---|---|---|---|---|---|---|
| Ingredients (% Concentration) | Gallons (g) | Order of addition | Pounds (Lb) | Lb/g | Gallons total | % of OD Chemical |
| Syrup | 80 | 4 | 824 | 10.3 | 80 | |
| Citric Acid (50%) | 0 | — | 0 | 10.4 | 61.2 | 54.1 |
| Lactic Acid (88%) | 0 | — | 0 | 10.08 | 17.0 | 25.6 |
| D-Limonene (97%) | 3 | 4 | 21 | 7 | 4.4 | 5.1 |
| Boric Acid (16%) | 33 | 3 | 328 | 9.93 | 33 | 9.0 |
| Copper sulfate (15%) | 2 | 2 | 19.8 | 9.88 | 2.3 | 0.6 |
| Hydrochloric Acid (32%) | 11 | 5 | 106.4 | 9.67 | 11.0 | 5.7 |
| Water | 121 | 1 | 1007.9 | 8.33 | 128.8 | |

House "B" Cedar Shavings were top dressed over the rice hull and Shavings were sprayed with New Rice Hull Formulation spray and not tilled.

House "A" 25,000 Sq. Ft. received New Rice Hull Formulation spray and rice hulls were tilled to intermix treatment.

250 gallons of New Rice Hull Formulation was diluted with an additional 250 gallons of water for application of 500 gallons to 25,000 square feet of treatment area, or 20 gallons per 1,000 square feet.

House "A" Cedar Shavings were top dressed over the rice hull. No treatment was applied and the shavings were not tilled.

The pH in each house: "A" was 4.2 and "B" was 3.9.

House "B" birds survived 10 weeks with a mortality rate of 1.8%, much lower than the historical Brood data at 5 to 10%. One turkey was lost during the move from brood to grow out. Historically, moving losses are 50 to 100 birds. No medication was required. This flock is alert, inquisitive and active, and it is described as the best flock ever.

House "A" birds were moved at 7 weeks with a mortality rate of 3.1%. House "A" birds at 10 weeks had a mortality rate of 5.8%. House "A" birds at 13 weeks had a mortality rate of 7.2%. They contracted E. coli in the last 4 days of brood. During the move 50 birds were lost. Water pH of the birds' drinking water was reduced from 7 to 6.0, and some improvement was noted Minimal treatment (non antibiotic) was started. These mortality rates are much less than the historical data for House A, that was 17.5% mortality.

Example 3: Further Formulation and Process Changes

Established new target pH of 3.5 to 3.2 for soil and rice hulls for better kill off microbes and promote longevity of the pH reduction. The new target very low pH did not harm the birds' feet. Feet scores were at Zero (scale of zero to five). The syrup formulation is shown in Table 7.1 and the test formulations are shown in Tables 7.2-7.4.

TABLE 7.1

| Additive Stock Solutions | | | Syrup Formulation | | |
|---|---|---|---|---|---|
| Ingredient | Concentration % | Lb/g | Total mix | Gallons (g) | Order of addition | Pounds (Lb) |
| Citric Acid | 50.0 | 10.4 | 73.6 | 184 | 1 | 1913.6 |
| Lactic Acid | 88.0 | 10.1 | 24.0 | 60 | 2 | 606.0 |
| D-Limonene* | 97.0 | 7 | 1.2 | 3 | 3 | 21.0 |
| Copper sulfate | 15.2 | 11.34 | 1.2 | 3 | 4 | 34.0 |

*Terpene

TABLE 7.2

(01) Final Washdown Test Formulation

| Ingredients (% Concentration) | Gallons (g) | Order of addition | Pounds (Lb) | Lb/g | Gallons total | % of OD Chemical |
|---|---|---|---|---|---|---|
| Syrup | 24 | 4 | 247.2 | 10.3 | 24 | |
| Citric Acid (50%) | 0 | — | 0 | 10.4 | 17.5 | 46.5 |
| Lactic Acid (88%) | 0 | — | 0 | 10.1 | 5.9 | 26.7 |
| D-Limonene (97%)* | 3.2 | 5 | 22.4 | 7 | 3.6 | 12.6 |
| Boric Acid (16%) | 15 | 3 | 149 | 9.93 | 15.0 | 12.3 |
| Copper sulfate (15%) | 2 | 2 | 22.7 | 9.88 | 2.6 | 2.0 |
| Water | 205.8 | 1 | 1714.3 | 8.33 | 44.6 | |

*Terpene

TABLE 7.3

(01) Floor Spray Test Formulation

| Ingredients (% Concentration) | Gallons (g) | Order of addition | Pounds (Lb) | Lb/g | Gallons total | % of OD Chemical |
|---|---|---|---|---|---|---|
| Syrup | 30 | 4 | 309 | 10.3 | 30 | |
| Citric Acid (50%) | 0 | — | 0 | 10.4 | 21.9 | 18.8 |
| Lactic Acid (88%) | 0 | — | 0 | 10.1 | 7.3 | 10.8 |
| D-Limonene (97%)* | 1.5 | 4 | 11 | 7 | 2.0 | 2.3 |
| Sulfuric Acid (97%) | 25 | 5 | 383 | 15.3 | 25.0 | 58.8 |
| Boric Acid (16%) | 33 | 3 | 327.7 | 9.93 | 33.0 | 8.7 |
| Copper sulfate (15%) | 2 | 2 | 20 | 9.88 | 2.4 | 0.6 |
| Water | 158.5 | 1 | 1320 | 8.33 | 91.6 | |

*Terpene

TABLE 7.4

(02) Rice Hulls Test Formulation

| Ingredients (% Concentration) | Gallons (g) | Order of addition | Pounds (Lb) | Lb/g | Gallons total | % of OD Chemical |
|---|---|---|---|---|---|---|
| Syrup | 197 | 4 | 2028.8 | 10.3 | 197 | |
| Citric Acid (50%) | 0 | — | 0 | 10.4 | 143.6 | 56.6 |
| Lactic Acid (88%) | 0 | — | 0 | 10.1 | 48.2 | 32.5 |
| D-Limonene (97%)* | 1.5 | 4 | 11 | 7 | 5.0 | 2.6 |
| Sulfuric Acid (97%) | 1.0 | 6 | 15 | 15.3 | 1.0 | 1.1 |
| Boric Acid (16%) | 33 | 3 | 328 | 9.93 | 33.0 | 4.0 |
| Copper sulfate (15%) | 2 | 2 | 19.8 | 9.88 | 2.4 | 0.3 |
| Hydrochloric Acid (32%) | 13.0 | 5 | 125.7 | 9.67 | 13.0 | 3.0 |
| Water | 2.5 | 1 | 20.8 | 8.33 | 246.2 | |

*Terpene 250 gallons of each of the Floor Spray Test Formulation and the Rice Hulls Test Formulation was diluted with an additional 250 gallons of water for application of 500 gallons to 25,000 square feet of treatment area, or 20 gallons per 1,000 square feet. For the Final Wash Down, the 250 gallons was applied with a power washer, 8 gallons per 1,000 square feet of the solution diluted in the power washer water.

Formulation Changes

(02) Rice Hulls: Added HCl to further reduce pH and add chloride ions.

(01) Floor Spray: First Use Formulation. Added new floor spray to shift soil pH down and kill organisms on the soil. Uses sulfuric acid in formulation, with the sulfur and the hydrogen ions reducing soil pH on the surface.

(01) Final WashDown: First Use Formulation. Developed a new spray for Final WashDown of the ceiling and walls of the barn to kill organism. Formulation uses less corrosive formulation containing more terpenes

Example 4: Two Brood Houses Treated with Further Modified Formulas

Historically, the mortality rate of these brood houses is so high (30%), the farmers are considering stopping growing turkeys. *E. Coli* started at 2 weeks of age with 150 or more lost each week. Brood house sizes are 10,000 (10K) and 16,500 (16K) square feet. Due to the houses' advanced disease history, they were fully treated. The floors in these houses were previously treated with lime, without our prior knowledge.

Spray Treatment System applied: (02) rice hulls, (01) Floor Spray, and (01) Final WashDown formulation from Table 7.2 to 7.4 was applied. The (01) Floor Spray applied to the floors to sterilize the soil surface and help reduce the pH of the soil with both H+ ions and Sulfur. Each House received one (17.3 ton) truckload of rice hulls. The (02) rice hulls formula was applied to the rice hulls at a per square foot rate and tilled. The walls and ceiling were sterilized with the (01) Final WashDown spray.

After treatment, the soil floor pH was 5.7 in 10K and pH of 5.6 in 16K house.

After treatment, the rice hulls bedding had a pH of 4.0 in 10K and pH of 3.7 in 16K house.

Dose related explanation below.

Response Changes
The 10K house contained 165% more rice hulls per Sq. Ft.
The 10K house received 60% the amount of spray on rice hulls as the 16K house.
Dosage rate effect was that the 10K house developed *E. Coli* 4 days before moving.
The rice hulls to treatment ratio 37.5% in 10K to 100% in 16K houses. The 16K house birds remained healthy after the move to grow-out. The historic brood mortality rates are significantly higher than the after treatment rate.
Much of the sulfuric acid was consumed by the lime reacting to form gypsum.
Determined that Rice Hulls spray rate should change from just Sq. Ft. to include both factored amounts of bedding used and Sq. Ft. for manure remediation.
Formulation Changes:
(03) Rice Hulls: Added HCl to reduce target pH of 3.5 to 3.2
(02) Floor Spray: Added more Sulfuric acid
(01) Final WashDown: no change in the formulation

Example 5: Barns "A" and "B" Grow-Out were Cleaned to the Soil and Sanitized Per SOP of Integrator Stock solution of additives and syrup formulation is shown in Table 8.1. Test formulations are shown in Tables 8.2-8.4. The following Spray Treatment System was applied:
(03) Rice Hulls in "B", (03*) Rice Hulls in "A" ((03*) contained ½ the Hydrochloric acid (HCL) of (03)) as a dosing study (resulting in higher initial pH) (02) Floor Spray, and (02) Final WashDown, as shown in Table 8.5. The (02) Floor Spray applied first to grow-out house "A" and rice hull were added (two truckloads). Rice hulls received (03*) Rice Hulls formula ((03*) contained ½ the Hydrochloric acid HCL of (03)) and were tilled in three passes. (01) Final WashDown formula is applied to the ceilings and walls. Overspray settles on the bedding surface. The same treatment system was applied to the "B" except (03) Rice Hulls formula contained full HCL amount. The "B" house had residual gypsum on the floor from a previous aGroPure trial.

TABLE 8.1

| Ingredients | Additive Stock Solutions | | Syrup Formulation | | |
|---|---|---|---|---|---|
| | Concentration % | Lb/g | Gallons (g) | Order of addition | Pounds (Lb) |
| Citric Acid | 50.0 | 10.4 | 184 | 1 | 1913.6 |
| Lactic Acid | 88.0 | 10.1 | 60 | 2 | 606.0 |
| D-Limonene* | 97.0 | 7 | 3 | 3 | 21.0 |
| Copper sulfate | 15.2 | 11.34 | 3 | 4 | 34.0 |

*Terpenes

TABLE 8.2

(02) Final Washdown Test Formulation

| Ingredients (% Concentration) | Gallons (g) | Order of addition | Pounds (Lb) | Lb/g | Gallons total | % of OD Chemical |
|---|---|---|---|---|---|---|
| Syrup | 24 | 4 | 247.2 | 10.3 | 24 | |
| Citric Acid (50%) | 0 | — | 0 | 10.4 | 17.5 | 46.5 |
| Lactic Acid (88%) | 0 | — | 0 | 10.1 | 5.9 | 26.7 |
| D-Limonene (97%)* | 3.2 | 5 | 22.4 | 7 | 3.6 | 12.6 |
| Boric Acid (16%) | 15 | 3 | 149 | 9.93 | 15.0 | 12.3 |
| Copper sulfate (15%) | 2 | 2 | 22.7 | 9.88 | 2.6 | 2.0 |
| Water | 205.8 | 1 | 1714.3 | 8.33 | 44.6 | |

*Terpene

TABLE 8.3

(02) Floor Spray Test Formulation

| Ingredients (% Concentration) | Gallons(g) | Order of addition | Pounds (Lb) | Lb/g | Gallons total | % of OD Chemical |
|---|---|---|---|---|---|---|
| Syrup | 30 | 4 | 309 | 10.3 | 30 | |
| Citric Acid (50%) | 0 | — | 0 | 10.4 | 21.9 | 18.8 |
| Lactic Acid (88%) | 0 | — | 0 | 10.1 | 7.3 | 10.8 |
| D-Limonene (97%)* | 1.5 | 4 | 11 | 7 | 2.0 | 2.3 |
| Sulfuric Acid (97%) | 25 | 5 | 383 | 15.3 | 25.0 | 58.7 |
| Boric Acid (16%) | 33 | 3 | 327.7 | 9.93 | 33.0 | 8.7 |
| Copper sulfate (15%) | 3 | 2 | 30 | 9.88 | 3.4 | 0.8 |
| Water | 157.50 | 1 | 1312 | 8.33 | 92.6 | |

*Terpene

TABLE 8.4

| Ingredients (% Concentration) | Gallons(g) | Order of addition | Pounds (Lb) | Lb/g | Gallons total | % of OD Chemical |
|---|---|---|---|---|---|---|
| (03) Rice Hulls Test Formulation | | | | | | |
| Syrup | 110 | 4 | 1132.8 | 10.3 | 110 | |
| Citric Acid (50%) | 0 | — | 0 | 10.4 | 80.2 | 49.8 |
| Lactic Acid (88%) | 0 | — | 0 | 10.1 | 26.9 | 28.6 |
| D-Limonene (97%)* | 1.5 | 4 | 11 | 7 | 3.4 | 2.8 |
| Boric Acid (16%) | 33 | 3 | 328 | 9.93 | 33.0 | 6.3 |
| Copper sulfate (15%) | 2 | 2 | 19.8 | 9.88 | 2.4 | 0.4 |
| Hydrochloric Acid (32%) | 33 | 5 | 319.1 | 9.67 | 33.0 | 12.0 |
| Water | 70.5 | 1 | 587.3 | 8.33 | 178.9 | |

*Terpene 250 gallons of each of the Floor Spray Test Formulation and the Rice Hulls Test Formulation was diluted with an additional 250 gallons of water for application of 500 gallons to 25,000 square feet of treatment area, or 20 gallons per 1,000 square feet. For the Final Wash Down, the 250 gallons was applied with a power washer, 8 gallons per 1,000 square feet of the solution diluted in the power washer water.

Response Changes

Dosage rate effect of the HCL was that "A" house developed E. Coli but were not medicated. The "A" house week 10 medication for dermatitis was started every other day Ammonia levels in the "A" grow-out started at the same time as Dermatitis. The "B" house birds remained healthy after the move to grow-out, one bird lost in move. The historic brood mortality rates are significantly (2×) higher than the after treatment rate. House "A" birds moved at 7 weeks with a mortality rate of 3.1%. House "A" birds at 10 weeks mortality was 5.8%. House "A" birds at 13 weeks mortality was 7.2%. House "B" birds have survived 10 weeks with a mortality rate of 1.8%, much lower than the historical Grow-out data at 15 to 20%.

Example 6: Further Formulation Changes

The following Spray Treatment System was applied
(04) Rice Hulls: add Sulfuric acid.
(03) Floor Spray: add HCl and more Sulfuric acid.
Investigate the use of gypsum (as a pH buffer) solution in our standard formulations. Delivered quantity is small but there is little additional cost of application.
(02) Final WashDown: Additional terpenes.

Stock solution of additives and syrup formulation is shown in Table 9.1. Test formulations are shown in Tables 9.2-9.4.

Investigate changes in Final WashDown formulation by adding Ozone as a separate method of sanitizing with dissolved ozone. When mixed with HCl the Chlorine ion multiples the sanitation. This solution can also be used as an aerosol to fog the whole house to denature the air of microbes, viruses and insects. This has application for air-born avian influenza prevention. First indications of test using hydrogen peroxide ($H_2O_2$) (35 g/L) resulted in reduced mortality and antibiotics were cut to ⅛ of the normal dose.

TABLE 9.1

| | Additive Stock Solutions | | | Syrup Formulation | | |
|---|---|---|---|---|---|---|
| Ingredients | Concentration % | Lb/g | Gallons (g) | Order of addition | Pounds (Lb) | % of Total Mix |
| Citric Acid | 50.0 | 10.4 | 184 | 1 | 1913.6 | 73.6 |
| Lactic Acid | 88.0 | 10.08 | 60 | 2 | 604.8 | 24 |
| Terpenes | 97.0 | 7 | 3 | 3 | 21.0 | 1.2 |
| Copper sulfate | 15.2 | 11.34 | 3 | 4 | 34.0 | 1.2 |

TABLE 9.2

| Ingredients (% Concentration) | Gallons(g) | Order of addition | Pounds (Lb) | Lb/g | Gallons total | % of OD Chemical |
|---|---|---|---|---|---|---|
| (02) Final Washdown Test Formulation | | | | | | |
| Syrup | 25 | 4 | 257.3 | 10.29 | 25 | |
| Citric Acid (50%) | 0 | — | 0 | 10.4 | 18.2 | 48.1 |
| Lactic Acid (88%) | 0 | — | 0 | 10.08 | 6.1 | 27.6 |
| D-Limonene (97%)* | 2.5 | 5 | 17.5 | 7 | 2.9 | 10.1 |

TABLE 9.2-continued

(02) Final Washdown Test Formulation

| Ingredients (% Concentration) | Gallons(g) | Order of addition | Pounds (Lb) | Lb/g | Gallons total | % of OD Chemical |
|---|---|---|---|---|---|---|
| Boric Acid (16%) | 15 | 3 | 149 | 9.93 | 15.0 | 12.2 |
| Copper sulfate (15%) | 2 | 2 | 22.7 | 9.88 | 2.6 | 2.0 |
| Water | 205.5 | 1 | 1711.8 | 8.33 | 44.9 | |

*Terpene

TABLE 9.3

(03) Floor Spray Test Formulation

| Ingredients (% Concentration) | Gallons(g) | Order of addition | Pounds (Lb) | Lb/g | Gallons total | % of OD Chemical |
|---|---|---|---|---|---|---|
| Syrup | 30 | 4 | 309 | 10.29 | 30 | |
| Citric Acid (50%) | 0 | — | 0 | 10.4 | 21.9 | 16.8 |
| Lactic Acid (88%) | 0 | — | 0 | 10.08 | 7.4 | 9.6 |
| D-Limonene (97%)* | 1.5 | 4 | 10.5 | 7 | 2.0 | 2.0 |
| Sulfuric Acid (97%) | 30 | 5 | 459 | 15.3 | 30.0 | 63.0 |
| Boric Acid (16%) | 33 | 3 | 327.7 | 9.93 | 33.0 | 7.8 |
| Copper sulfate (15%) | 3 | 2 | 30 | 9.88 | 3.4 | 0.7 |
| Water | 152.50 | 1 | 1270 | 8.33 | 97.6 | |

*Terpene

TABLE 9.4

(04) Rice Hulls Test Formulation

| Ingredients (% Concentration) | Gallons(g) | Order of addition | Pounds (Lb) | Lb/g | Gallons total | % of OD Chemical |
|---|---|---|---|---|---|---|
| Syrup | 80 | 4 | 823.5 | 10.29 | 80 | |
| Citric Acid (50%) | 0 | — | 0 | 10.4 | 58.3 | 43.2 |
| Lactic Acid (88%) | 0 | — | 0 | 10.08 | 19.6 | 24.8 |
| D-Limonene (97%)* | 3 | 5 | 21 | 7 | 4.4 | 4.3 |
| Boric Acid (16%) | 33 | 3 | 328 | 9.93 | 33.0 | 7.5 |
| Copper sulfate (15%) | 2 | 2 | 20 | 9.88 | 3 | 0.6 |
| Hydrochloric Acid (32%) | 45 | 6 | 435.2 | 9.67 | 45 | 19.5 |
| Water | 87.0 | 1 | 724.7 | 8.33 | 163.3 | |

*Terpene 250 gallons of each of the Floor Spray Test Formulation and the Rice Hulls Test Formulation was diluted with an additional 250 gallons of water for application of 500 gallons to 25,000 square feet of treatment area, or 20 gallons per 1,000 square feet. For the Final Wash Down, the 250 gallons was applied with a power washer, 8 gallons per 1,000 square feet of the solution diluted in the power washer water.

Note: Sulfuric Acid will cause gypsum to precipitate out of solutions. Organic acids and HCl ionize the gypsum. Sulfuric acid reverses this reaction. Sulfuric acid increases the ozone's solubility in water.

General Observations from Examples

Good ammonia control was observed in the brood houses with using the floor, bedding and wash down treatments. The same treatment application to the grow out is lasting 4 weeks before ammonia levels are noticed.

Gypsum will be added to the diluted mixtures. The acids used in the mix increases solubility of gypsum in the solution (no $H_2SO_4$ used). The intent is to buffer the acidity on the rice hulls (buffers tend to stabilize the pH). There is some additional cost for gypsum, electricity and mixing labor in this application.

To maintain ammonia control for the full flock-cycle, more gypsum may be applied (e.g., as a powder), to buffer the acidity of the bedding. This should provide a barrier separation from low pH bedding and birds' feet. It should reduce the fuming as manure is excreted on it.

Note: Addition of sulfuric acid reverses ionization and precipitates the gypsum out of solution. Thus, in some formulations, sulfuric acid should not be used in the formulation in which gypsum is present or added.

Without wishing to be bound by theory, it is theorized that some example formulations have multiple chemical mechanisms to reduce disease:

- Specific organic acids attack the organisms and reduce pH.
- Strong mineral acids break down cell walls and reduce pH.
- Organic terpenes reduce the growth of microbes, viruses and fungi.
- Psychotropic effects of terpenes range from aromas that are appetite-increasing to control of insects and pests.
- Coccidiostat (copper sulfate) reduces microbes.

These mechanisms work together to intensify the others' effectiveness.

Example 7: Example Formulations

Grow Bedding test formulation, Peroxide test formulation, and Ozone test formulation are shown in Tables 10.2-10.4, Stock solutions of Additives and Syrup Formulation is shown in Table 10.1, and applications and cost are shown in Table 10.5. Additional example formulations of the Wash Down, Floor Conditioner, Bedding Treatment (Brood and Grow), and Dirty Litter treatment compositions are provided in Tables 11.1-11.5 and 12.1-12.5. Also indicated is an order in which the ingredients may be added to the water.

TABLE 10.1

| | Additive Stock Solutions | | Syrup Formulation | | | |
|---|---|---|---|---|---|---|
| Ingredients | Concentration % | Lb/g | Gallons (g) | Order of addition | Pounds (Lb) | % of Total Mix |
| Citric Acid | 50.0 | 10.4 | 184 | 1 | 1913.6 | 73.6 |
| Lactic Acid | 88.0 | 10.1 | 60 | 2 | 606.0 | 24 |
| Terpenes | 97.0 | 7 | 3 | 3 | 21.0 | 1.2 |
| Copper sulfate | 15.2 | 11.34 | 3 | 4 | 34.0 | 1.2 |

TABLE 10.2

Final Washdown - Peroxide Test Formulation

| Ingredients (% Concentration) | Gallons(g) | Order of addition | Pounds (Lb) | Lb/g | Gallons total | % of OD Chemical |
|---|---|---|---|---|---|---|
| Syrup | 10 | 4 | 103.0 | 10.3 | 48 | |
| Citric Acid (50%) | 0 | — | 0 | 10.4 | 7.3 | 35.9 |
| Lactic Acid (88%) | 0 | — | 0 | 10.1 | 2.4 | 20.6 |
| D-Limonene (97%)* | 2.5 | 5 | 17.5 | 7 | 2.7 | 17.2 |
| Boric Acid (16%) | 15 | 3 | 149 | 9.93 | 15.0 | 22.7 |
| Copper sulfate (15%) | 2 | 2 | 22.7 | 9.88 | 2.4 | 3.4 |
| Hydrogen Peroxide (30%) | 8 | 1 | | | | |
| Water | 220.5 | 1 | 1836.8 | 8.33 | 29.8 | |

*Terpene

TABLE 10.3

Final Washdown - Ozone Test Formulation

| Ingredients (% Concentration) | Gallons(g) | Order of addition | Pounds (Lb) | Lb/g | Gallons total | % of OD Chemical |
|---|---|---|---|---|---|---|
| Syrup | 10 | 4 | 103 | 10.3 | 10 | |
| Citric Acid (50%) | 0 | — | 0 | 10.4 | 7.3 | 34.5 |
| Lactic Acid (88%) | 0 | — | 0 | 10.1 | 2.4 | 19.8 |
| D-Limonene (97%)* | 3 | 4 | 21 | 7 | 3.2 | 19.6 |
| Boric Acid (16%) | 15 | 3 | 149 | 9.93 | 15 | 21.8 |
| Copper sulfate (15%) | 3 | 2 | 30 | 9.88 | 3.1 | 4.3 |
| Ozone to 0.5 ppm or less | | 5 | | | 0.5 ppm | |
| Water | 219.0 | 1 | 1824 | 8.33 | 31 | |

*Terpene

TABLE 10.4

Brood or Growout Bedding Test Formulation

| Ingredients (% Concentration) | Gallons(g) | Order of addition | Pounds (Lb) | Lb/g | Gallons total | % of OD Chemical |
|---|---|---|---|---|---|---|
| Syrup | 80 | 4 | 823.9 | 10.3 | 48 | |
| Citric Acid (50%) | 0 | — | 0 | 10.4 | 58.3 | 43.2 |
| Lactic Acid (88%) | 0 | — | 0 | 10.1 | 19.6 | 24.8 |
| D-Limonene (97%)* | 3 | 5 | 21 | 7 | 4.4 | 4.3 |
| Boric Acid (16%) | 33 | 3 | 328 | 9.93 | 33.0 | 7.5 |
| Copper sulfate (15%) | 3 | 2 | 30 | 9.88 | 3 | 0.6 |
| Hydrochloric Acid (32%) | 45 | 6 | 435.2 | 9.67 | 45 | 19.5 |
| Ozone to 1.5 ppm | | | | | 0.5 to 1.5 ppm | |
| Gypsum | | | | | 416 lb** | |
| Water | 86.0 | 1 | 716.4 | 8.33 | 164.3 | |

*Terpene
**added to the 500 gallons total solution before application 250 gallons of the Brood or Growout Bedding Test Formulation is diluted with an additional 250 gallons of water for application of 500 gallons, then the 416 pounds of gypsum is added, for a 25,000 square feet of treatment area, or 20 gallons per 1,000 square feet. For the Final Wash Down, the 250 gallons is applied with a power washer, 8 gallons per 1,000 square feet of the solution diluted in the power washer water.

TABLE 11.1

Washdown Test Formulation

| Ingredients (% Concentration) | % Solution at Application Dilution | Order of Addition | Pounds (Lb) of OD Chemical | Total lb Solution | % of OD Chemical |
|---|---|---|---|---|---|
| Citric Acid (50%) | 6.3 | 3 | 94.7 | 189.4 | 47.9 |
| Lactic Acid (88%) | 2.1 | 4 | 54.35 | 61.76 | 27.5 |
| D-Limonene (97%)* | 0.7 | 5 | 19.97 | 20.59 | 10.1 |
| Boric Acid (16%) | 5.2 | 2 | 24.94 | 154.91 | 12.6 |
| Copper sulfate (15%) | 0.9 | 1 | 3.92 | 25.77 | 2 |

*Terpene

TABLE 11.2

Floor Conditioning Test Formulation

| Ingredients (% Concentration) | % Solution at Application Dilution | Order of Addition | Pounds (Lb) of OD Chemical | Total lb Solution | % of OD Chemical |
|---|---|---|---|---|---|
| Citric Acid (50%) | 3.5 | 3 | 113.64 | 227.28 | 17.5 |
| Lactic Acid (88%) | 1.1 | 4 | 65.22 | 74.11 | 10.0 |
| D-Limonene (97%)* | 0.2 | 5 | 13.78 | 14.21 | 2.1 |
| Sulfuric Acid (97%) | 7 | 6 | 426.87 | 459 | 65.7 |
| Boric Acid (16%) | 2.4 | 2 | 24.94 | 154.91 | 3.8 |
| Copper sulfate (15%) | 0.5 | 1 | 5.07 | 33.35 | 0.8 |

*Terpene

TABLE 11.3

Brood Bedding Test Formulation

| Ingredients (% Concentration) | % Solution at Application Dilution | Order of Addition | Pounds (Lb) of OD Chemical | Total lb Solution | % of OD Chemical |
|---|---|---|---|---|---|
| Citric Acid (50%) | 11.6 | 3 | 303.05 | 606.09 | 35.6 |
| Lactic Acid (88%) | 3.8 | 4 | 173.92 | 197.64 | 20.4 |
| D-Limonene (97%)* | 0.6 | 5 | 29.96 | 30.88 | 3.5 |
| Sulfuric Acid (97%) | 0.6 | 7 | 28.46 | 30.6 | 3.3 |
| Boric Acid (16%) | 6.2 | 2 | 52.76 | 327.69 | 6.2 |
| Copper sulfate (15%) | 15.8 | 1 | 125.77 | 827.43 | 14.8 |
| Hydrochloric Acid (32%) | 8.3 | 6 | 136.85 | 435.15 | 16.1 |

*Terpene

TABLE 11.4

Grow Bedding Test Formulation

| Ingredients (% Concentration) | % Solution at Application Dilution | Order of Addition | Pounds (Lb) of OD Chemical | Total lb Solution | % of OD Chemical |
|---|---|---|---|---|---|
| Citric Acid (50%) | 13.6 | 3 | 303.05 | 606.09 | 40.0 |
| Lactic Acid (88%) | 4.4 | 4 | 173.92 | 197.64 | 22.9 |
| D-Limonene (97%)* | 0.7 | 5 | 29.96 | 30.88 | 4.0 |
| Sulfuric Acid (97%) | 1.4 | 7 | 56.92 | 61.2 | 7.5 |
| Boric Acid (16%) | 7.3 | 2 | 52.76 | 327.69 | 7.0 |
| Copper sulfate (15%) | 0.7 | 1 | 4.51 | 29.64 | 0.6 |
| Hydrochloric Acid (32%) | 9.8 | 6 | 136.85 | 435.15 | 18.1 |

*Terpene

This example Grow Bedding Test formulation is stronger than the Brood Bedding Test formulation due to a longer time the animals may spend in the house, to hold pH longer.

TABLE 11.5

Dirty Litter Test Formulation

| Ingredients (% Concentration) | % Solution at Application Dilution | Order of Addition | Pounds (Lb) of OD Chemical | Total lb Solution | % of OD Chemical |
|---|---|---|---|---|---|
| Citric Acid (50%) | 13.7 | 3 | 378.81 | 757.61 | 46.6 |
| Lactic Acid (88%) | 4.5 | 4 | 217.4 | 247.05 | 26.7 |
| D-Limonene (97%)* | 0.5 | 5 | 25.56 | 26.35 | 3.1 |
| Boric Acid (16%) | 5.9 | 2 | 52.76 | 327.69 | 6.5 |
| Copper sulfate (15%) | 0.6 | 1 | 4.88 | 32.11 | 0.6 |
| Hydrochloric Acid (32%) | 7.7 | 6 | 133.81 | 425.48 | 16.5 |

*Terpene

TABLE 12.1

Washdown Test Formulation

| Ingredients (% Concentration) | % Solution at Application Dilution | Order of Addition | Pounds (Lb) of OD Chemical | Total lb Solution | % of OD Chemical |
|---|---|---|---|---|---|
| Citric Acid (50%) | 6.3 | 3 | 94.7 | 189.4 | 47.9 |
| Lactic Acid (88%) | 2.1 | 4 | 54.35 | 61.76 | 27.5 |
| D-Limonene (97%)* | 0.7 | 5 | 19.97 | 20.59 | 10.1 |
| Boric Acid (16%) | 5.2 | 2 | 24.94 | 154.91 | 12.6 |
| Copper sulfate (15%) | 0.9 | 1 | 3.92 | 25.77 | 2 |

*Terpene

TABLE 12.2

Floor Conditioning Test Formulation

| Ingredients (% Concentration) | % Solution at Application Dilution | Order of Addition | Pounds (Lb) of OD Chemical | Total lb Solution | % of OD Chemical |
|---|---|---|---|---|---|
| Citric Acid (50%) | 3.5 | 3 | 113.64 | 227.28 | 17.5 |
| Lactic Acid (88%) | 1.1 | 4 | 65.22 | 74.11 | 10.0 |
| D-Limonene (97%)* | 0.2 | 5 | 13.78 | 14.21 | 2.1 |
| Sulfuric Acid (97%) | 7 | 6 | 426.87 | 459 | 65.7 |
| Boric Acid (16%) | 2.4 | 2 | 24.94 | 154.91 | 3.8 |
| Copper sulfate (15%) | 0.5 | 1 | 5.07 | 33.35 | 0.8 |

*Terpene

TABLE 12.3

Brood Bedding Test Formulation

| Ingredients (% Concentration) | % Solution at Application Dilution | Order of Addition | Pounds (Lb) of OD Chemical | Total lb Solution | % of OD Chemical |
|---|---|---|---|---|---|
| Citric Acid (50%) | 11.6 | 3 | 303.05 | 606.09 | 36.9 |
| Lactic Acid (88%) | 3.8 | 4 | 173.92 | 197.64 | 21.2 |
| D-Limonene (97%)* | 0.6 | 5 | 29.96 | 30.88 | 3.6 |
| Boric Acid (16%) | 6.3 | 2 | 52.76 | 327.69 | 6.4 |
| Copper sulfate (15%) | 15.8 | 1 | 125.77 | 827.43 | 15.3 |
| Hydrochloric Acid (32%) | 8.3 | 6 | 136.85 | 435.15 | 16.6 |

*Terpene

TABLE 12.4

Grow Bedding Test Formulation

| Ingredients (% Concentration) | % Solution at Application Dilution | Order of Addition | Pounds (Lb) of OD Chemical | Total lb Solution | % of OD Chemical |
|---|---|---|---|---|---|
| Citric Acid (50%) | 13.7 | 3 | 303.05 | 606.09 | 43.2 |
| Lactic Acid (88%) | 4.5 | 4 | 173.92 | 197.64 | 24.8 |
| D-Limonene (97%)* | 0.7 | 5 | 29.96 | 30.88 | 4.3 |
| Boric Acid (16%) | 7.4 | 2 | 52.76 | 327.69 | 7.5 |
| Copper sulfate (15%) | 0.7 | 1 | 4.51 | 29.64 | 0.6 |
| Hydrochloric Acid (32%) | 9.8 | 6 | 136.85 | 435.15 | 19.5 |

*Terpene

TABLE 12.5

Dirty Litter Test Formulation

| Ingredients (% Concentration) | % Solution at Application Dilution | Order of Addition | Pounds (Lb) of OD Chemical | Total lb Solution | % of OD Chemical |
|---|---|---|---|---|---|
| Citric Acid (50%) | 13.2 | 3 | 378.81 | 757.61 | 30.5 |
| Lactic Acid (88%) | 4.3 | 4 | 217.4 | 247.05 | 17.5 |
| D-Limonene (97%)* | 0.5 | 5 | 25.56 | 26.35 | 2.1 |
| Sulfuric Acid (97%) | 8 | 7 | 426.87 | 459 | 34.4 |
| Boric Acid (16%) | 5.7 | 2 | 52.76 | 327.69 | 4.3 |
| Copper sulfate (15%) | 0.6 | 1 | 4.88 | 32.11 | 0.4 |
| Hydrochloric Acid (32%) | 7.4 | 6 | 133.81 | 425.48 | 10.8 |

*Terpene

Example 8: Example Methods

A floor spray is applied containing sulfuric acid, which reduces the soil pH. The acidic soil may repel the negatively-charged ammonium, which reduces the amount of nitrogen lost by soil penetration.

Elemental sulfur may also be applied to the floor, with or before the floor spray.

Powdered Gypsum may also be applied to the floor (or covered floor).

A physical barrier such as an aGroMat sheet may also be applied over the floor.

A Gypsum layer may be added or repeated over the aGroMat, and cleanout (e.g., de-cake aGroPro litter down to the gypsum layer with appropriate machinery) leaves the gypsum layer.

Walls and ceilings may be treated with Wash Down spray and/or ozone treatment with fogging.

Example formulations are provided in Tables 13.2-13.5 and the additive stock solutions and syrup formulation are provided in Table 13.1. Application of formulations are provided in Table 13.6.

TABLE 13.1

| | Additive Stock Solutions | | Syrup Formulation | | | |
|---|---|---|---|---|---|---|
| Ingredients | Concentration % | Lb/g | Gallons (g) | Order of addition | Pounds (Lb) | % of Total Mix |
| Citric Acid | 50.0 | 10.4 | 180 | 1 | 1872 | 72 |
| Lactic Acid | 88.0 | 10.1 | 60 | 2 | 606 | 24 |
| D-Limonene | 97.0 | 7 | 3 | 3 | 21.0 | 1.2 |
| Copper sulfate | 15.2 | 11.34 | 3 | 4 | 34.0 | 1.2 |
| Additional Terpene* | 99 | 7 | 3 | 4 | 21 | 1.2 |

*optional

TABLE 13.2

| | Ozone Washdown Test Formulation | | | | | |
|---|---|---|---|---|---|---|
| Ingredients (% Concentration) | Gallons(g) | Order of addition | Pounds (Lb) | Lb/g | Gallons total | % of OD Chemical |
| Syrup | 10 | 4 | 101.07 | 10.17 | 48 | |
| Citric Acid (50%) | 0 | — | 0 | 10.4 | 7 | 32.8 |
| Lactic Acid (88%) | 0 | — | 0 | 10.1 | 2.4 | 19.3 |
| D-Limonene (97%) | 3 | 5 | 21 | 7 | 3.2 | 19.3 |
| Boric Acid (16%) | 9 | 3 | 89.4 | 9.93 | 9 | 12.9 |
| Copper sulfate (15%) | 22 | 2 | 22.7 | 9.88 | 2.4 | 3.3 |
| Ozone | | | | | 0.5 ppm | |
| Neem oil | 1 | | 7 | 7 | 1 | 6.2 |
| Additional Terpene | 1 | | 7 | 9.88 | 0.8 | 7.3 |
| Water | 26 | 1 | 297.5 | 8.33 | 35.4 | |

TABLE 13.3

| | Ozone Washdown Test Formulation 2 | | | | | |
|---|---|---|---|---|---|---|
| Ingredients (% Concentration) | Gallons(g) | Order of addition | Pounds (Lb) | Lb/g | Gallons total | % of OD Chemical |
| Syrup | 25 | 4 | 254 | 10.17 | 25 | |
| Citric Acid (50%) | 0 | — | 0 | 10.4 | 17.5 | 49.9 |
| Lactic Acid (88%) | 0 | — | 0 | 10.1 | 6.0 | 29.3 |
| D-Limonene (97%)* | 2.5 | 5 | 18 | 7 | 2.9 | 10.9 |
| Boric Acid (16%) | 9 | 3 | 89.4 | 9.93 | 9 | 7.8 |
| Copper sulfate (15%) | 2 | 2 | 20 | 9.88 | 2.3 | 1.9 |
| Ozone | | | | | 0.5 ppm | |

TABLE 13.3-continued

Ozone Washdown Test Formulation 2

| Ingredients (% Concentration) | Gallons(g) | Order of addition | Pounds (Lb) | Lb/g | Gallons total | % of OD Chemical |
|---|---|---|---|---|---|---|
| Neem oil | 4 | | 28 | 7 | 4 | 15.1 |
| Additional Terpene (optional) | 0 | 2 | 0 | 9.88 | 0.3 | 1.5 |
| Water | 43.6 | 1 | 440.4 | 8.33 | 72.8 | |

*Terpene aGroMat may be applied to the floor as well.

TABLE 13.4

Floor Fix Test Formulation

| Ingredients (% Concentration) | Gallons(g) | Order of addition | Pounds (Lb) | Lb/g | Gallons total | % of OD Chemical |
|---|---|---|---|---|---|---|
| Syrup | 30 | 4 | 305.2 | 10.17 | 48 | |
| Citric Acid (50%) | 0 | — | 0 | 10.4 | 21.1 | 16.5 |
| Lactic Acid (88%) | 0 | — | 0 | 10.1 | 7.3 | 9.7 |
| D-Limonene (97%)* | 1 | 5 | 7 | 7 | 1.2 | 1.2 |
| Sulfuric Acid (97%) | 30 | 6 | 459 | 15.3 | 30 | 63.9 |
| Boric Acid (16%) | 33 | 3 | 326 | 9.93 | 33.6 | 8 |
| Copper sulfate (15%) | 3 | 2 | 30 | 9.88 | 3.1 | 0.7 |
| Ozone | | | | | 0.5-1.5 ppm | |
| Neem oil | 1 | | 7 | 7 | 1.2 | 1.3 |
| Sulfur | | | 100 | | | |
| Water | 98 | 1 | 1315.5 | 8.33 | 279.4 | |

*Terpene

TABLE 13.5

Litter Fix Test Formulation

| Ingredients (% Concentration) | Gallons(g) | Order of addition | Pounds (Lb) | Lb/g | Gallons total | % of OD Chemical |
|---|---|---|---|---|---|---|
| Syrup | 60 | 4 | 305.2 | 10.17 | 60 | |
| Citric Acid (50%) | 0 | — | 0 | 10.4 | 42.3 | 38.5 |
| Lactic Acid (88%) | 0 | — | 0 | 10.08 | 14.5 | 22.6 |
| D-Limonene (97%)* | 3 | | 7 | 7 | 4 | 4.8 |
| Boric Acid (16%) | 33 | 3 | 326 | 9.93 | 33.0 | 9.2 |
| Copper sulfate (15%) | 3 | 2 | 30 | 9.88 | 3.7 | 1.0 |
| Hydrochloric Acid (32%) | 45 | 5 | 0 | 9.67 | 45.0 | 24.0 |
| Neem oil | 2 | 6 | 7 | 7 | 2 | 2.4 |
| Water | 146 | 1 | 1315.5 | 8.33 | 394.5 | |

*Terpene

That which is claimed is:

1. An animal bedding comprising an aqueous composition comprising, in combination:
   a) an organic acid; and
   b) an organic terpene,
   wherein said aqueous composition has a pH of from 2 to 5.

2. The animal bedding of claim 1, wherein said animal bedding comprises rice hulls, soft wood sawdust/shavings, or a combination thereof.

3. A process for the control of ammonia and/or microbes in animal housing, comprising:
   applying as a bedding treatment composition to a bedding of the animal housing an aqueous composition comprising, in combination:
   a) an organic acid; and
   b) an organic terpene,
   wherein said aqueous composition has a pH of from 2 to 5, and
   applying the bedding to the floor of the animal housing, whereby said applying step(s) result in the control of ammonia and/or microbes in the animal housing.

4. The process of claim 3, wherein said process further comprises applying a floor conditioning composition, and said floor conditioning composition comprises sulfuric acid.

5. The process of claim 3, further comprising applying elemental sulfur to the floor of the animal housing.

6. The process of claim 3, wherein the floor of the animal housing is covered by a physical barrier.

7. The process of claim 3, wherein said animal housing houses an avian animal selected from chickens, turkeys and ducks.

\* \* \* \* \*